US008618233B2

(12) United States Patent
Alvarez et al.

(10) Patent No.: US 8,618,233 B2
(45) Date of Patent: Dec. 31, 2013

(54) DUAL CURING POLYMERS AND METHODS FOR THEIR PREPARATION AND USE

(75) Inventors: Khristopher Alvarez, Midland, MI (US); Nick Shephard, Midland, MI (US); James Tonge, Sanford, MI (US)

(73) Assignee: Dow Corning Corporation, Midland, MI (US)

( * ) Notice: Subject to any disclaimer, the term of this patent is extended or adjusted under 35 U.S.C. 154(b) by 985 days.

(21) Appl. No.: 12/517,211

(22) PCT Filed: Nov. 7, 2007

(86) PCT No.: PCT/US2007/023467
§ 371 (c)(1),
(2), (4) Date: Nov. 18, 2009

(87) PCT Pub. No.: WO2008/076184
PCT Pub. Date: Jun. 26, 2008

(65) Prior Publication Data
US 2010/0092690 A1    Apr. 15, 2010

Related U.S. Application Data

(60) Provisional application No. 60/876,275, filed on Dec. 21, 2006.

(51) Int. Cl.
*C08G 77/08* (2006.01)

(52) U.S. Cl.
USPC .......... 528/15; 528/31; 528/35; 428/447; 427/387; 522/148

(58) Field of Classification Search
USPC .......... 528/15, 31, 35; 427/387; 428/447; 522/148
See application file for complete search history.

(56) References Cited

U.S. PATENT DOCUMENTS

| | | | |
|---|---|---|---|
| 3,122,522 A | 2/1964 | Brown et. al. | |
| 3,159,601 A | 12/1964 | Ashby | |
| 3,175,993 A | 3/1965 | Weyenberg | |
| 3,220,972 A | 11/1965 | Lamoreaux | |
| 3,296,291 A | 1/1967 | Chalk et al. | |
| 3,419,593 A | 12/1968 | Willing | |
| 3,516,946 A | 6/1970 | Modic | |
| 3,814,730 A | 6/1974 | Karstedt | |
| 3,989,668 A | 11/1976 | Lee et al. | |
| 4,087,585 A | 5/1978 | Schulz | |
| 4,143,088 A | 3/1979 | Favre et al. | |
| 4,173,551 A | 11/1979 | Crivello | |
| 4,279,717 A | 7/1981 | Eckberg et al. | |
| 4,290,869 A | 9/1981 | Pigeon | |
| 4,310,469 A | 1/1982 | Crivello | |
| 4,313,988 A | 2/1982 | Koshar et al. | |
| 4,374,751 A | 2/1983 | Dudgeon | |
| 4,528,081 A | 7/1985 | Lien | |
| 4,699,802 A | 10/1987 | Nakos et al. | |
| 4,753,977 A | 6/1988 | Merrill | |
| 4,772,675 A | 9/1988 | Klosowski et al. | |
| 4,784,879 A | 11/1988 | Lee et al. | |
| 4,962,076 A | 10/1990 | Chu et al. | |
| 4,966,922 A | 10/1990 | Gross et al. | |
| 4,987,158 A | 1/1991 | Eckberg | |
| 5,036,117 A | 7/1991 | Chung et al. | |
| 5,051,455 A | 9/1991 | Chu et al. | |
| 5,053,442 A | 10/1991 | Chu et al. | |
| 5,175,325 A | 12/1992 | Brown et al. | |
| 5,194,649 A | 3/1993 | Okawa | |
| 5,198,476 A | 3/1993 | Kobayashi et al. | |
| 5,212,211 A | 5/1993 | Welch et al. | |
| 5,248,715 A | 9/1993 | Gray et al. | |
| 5,310,843 A | 5/1994 | Morita | |
| 5,340,898 A | 8/1994 | Cavezzan et al. | |
| 5,369,205 A | 11/1994 | Eckberg et al. | |
| 5,468,826 A * | 11/1995 | Gentle et al. ................... | 528/15 |
| 5,468,827 A | 11/1995 | Morita | |
| 5,484,950 A | 1/1996 | Crivello | |
| 5,498,642 A | 3/1996 | Chu et al. | |
| 5,516,812 A | 5/1996 | Chu et al. | |
| 5,744,507 A | 4/1998 | Angel et al. | |
| 5,750,587 A | 5/1998 | Manzouji et al. | |

(Continued)

FOREIGN PATENT DOCUMENTS

| | | |
|---|---|---|
| EP | 0 562 922 B1 | 3/1993 |
| EP | 0 347 895 B1 | 11/1993 |
| EP | 0 539 234 B1 | 3/1997 |
| EP | 0 776 945 A2 | 6/1997 |
| EP | 0 759 457 B1 | 6/2001 |
| WO | WO 97/35924 A1 | 10/1997 |
| WO | WO 02/098664 A1 | 12/2002 |
| WO | WO 03/093349 A1 | 11/2003 |

OTHER PUBLICATIONS

Crivello, J.V., et. al. "The Synthesis of Novel Silicon-Containing Epoxy Monomers and Oligomers", Aug. 1991, p. 173, vol. 32, Polymer Preprints.

(Continued)

*Primary Examiner* — Margaret Moore
(74) *Attorney, Agent, or Firm* — Claude F. Purchase

(57) ABSTRACT

A polymer cures by either radiation or moisture curing mechanisms, or both. The polymer is prepared by hydrosilylation. The polymer includes units of formula: $(R^2{}_2SiO_{2/2})_b$, $(R^2SiO_{3/2})_c$, $(SiO_{4/2})_d$, $(R^{1'})_f$, and $(R^2{}_3SiO_{1/2})_g$, where each $R^{1'}$ is independently an oxygen atom or a divalent hydrocarbon group; each $R^{1'}$ is independently divalent hydrocarbon group; each $R^2$ is independently a monovalent organic group that is free of terminal aliphatic unsaturation each X is independently a monovalent hydrolyzable group; each J is independently a monovalent epoxy functional organic group; subscript a has a value of 1 or more; subscript b has a value of 0 or more; subscript c has a value of 0 or more; subscript d has a value of 0 or more; subscript e has a value of 1 or more; subscript f has a value of 0 or more; subscript g has a value of 0 or more; subscript s is 1, 2, or 3; and subscript t is 1, 2, or 3.

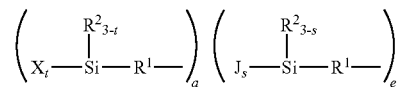

20 Claims, No Drawings

(56) References Cited

U.S. PATENT DOCUMENTS

| | | |
|---|---|---|
| 5,958,176 A | 9/1999 | Isshiki et al. |
| 6,127,502 A | 10/2000 | Krahnke et al. |
| 6,140,447 A | 10/2000 | Gay et al. |
| 6,359,097 B1 | 3/2002 | Jost et al. |
| 6,451,870 B1 | 9/2002 | DeCato et al. |
| 2004/0116547 A1 | 6/2004 | Bennington |
| 2006/0074212 A1 | 4/2006 | Chapman et al. |

OTHER PUBLICATIONS

Crivello, J.V., et. al. "The Synthesis and Polymerization of Monomers Containing Epoxy and Alkoxysilane Groups", J. of Polymer Science, 1993, pp. 3121-3132, vol. 31.

Crivello, J.V., et. al. "The Synthesis and Cationic Polymerization of Multifunctional Silicon-Containing Epoxy Monomers and Oligomer", J. of Polymer Science, 1994, pp. 683-697.

* cited by examiner

DUAL CURING POLYMERS AND METHODS FOR THEIR PREPARATION AND USE

CROSS REFERENCE TO RELATED APPLICATIONS

This application is a U.S. national stage filing under 35 U.S.C. §371 of PCT Application No. PCT/US07/023,467 filed on 7 Nov. 2007, currently pending, which claims the benefit of U.S. Provisional Patent Application No. 60/876,275 filed on 21 Dec. 2006 under 35 U.S.C. §119 (e). PCT Application No. PCT/US07/023,467 and U.S. Provisional Patent Application No. 60/876,275 are hereby incorporated by reference.

BACKGROUND

1. Technical Field

A dual curing silicone polymer has functional groups that cure by two different curing mechanisms. Compositions containing the polymer described herein cure to form products (networks) having comparable structures and strengths regardless of which curing mechanism is employed. The polymer and compositions are useful in electronics applications, for example, as conformal coatings, sealants, and adhesives.

2. Problems to be Solved

Radiation (e.g., ultra-violet, UV) curable coatings rely on line of sight irradiation to effect cure. UV cure is a low temperature, rapid, command cure process, which allows fabricators to produce a large amount of cured materials in a small space with high throughput. This makes UV curing an attractive technique for electronic circuit board manufacturers. However, the complicated architecture of component laden circuit boards makes them less than ideal candidates for UV cure due to the "shadow areas" under the components.

Two chemistries are used extensively in UV curable coatings; one is the acrylates the other is the epoxies. Acrylate based systems are triggered by photo generated radical species. The half-life of the radicals in the photoinitiation and polymerization is relatively short such that the polymerization only occurs when active irradiation is taking place. The epoxy based systems cure via a cationic mechanism whereby a latent acid, generally in the form of an onium salt, is fragmented by UV radiation to give a strong acid, which then initiates the self addition of epoxy groups to form an ether linkage. The reactive cationic centers, have relatively long half-life, such that polymerization can continue for days, depending on the nature of the curing matrices. In rigid systems, the cationic centers become trapped in the matrix, and a post-bake can be used to increase the mobility of the matrix hence the cure. In flexible silicone epoxies the polymerization can continue at room temperature.

Several approaches have been proposed to address the problem of shadow cure. One example is baking coatings. Post baking the circuit board after UV irradiation is a costly second step which defeats the purpose of using UV. Furthermore, heat can initiate the breakdown of onium salts for curing cationic species. Similarly, heat can decompose a radical producing species such as peroxides or hyperperoxides for curing the acrylate based systems.

An alternative approach to addressing the problem of shadow cure is a so-called dual cure material. The conventional route to such materials is via a UV triggered radically initiated acrylate functional siloxane with an anaerobic radical initiator system as a secondary mechanism, or conversely via moisture initiated silicone room temperature vulcanizable (RTV) chemistries such as a methoxy silane functional material as shown below.

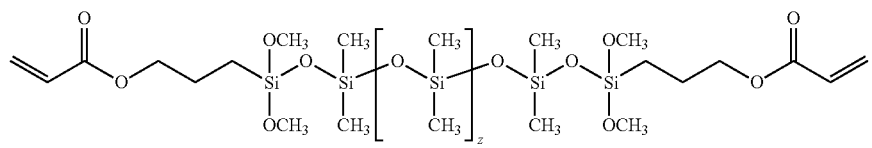

The silicone acrylate polymers in this family are typically derived by end capping a linear silanol functional polydimethylsiloxane fluid with a trimethoxyacryl silane. While acrylated silicones are available, they suffer from the drawbacks of 1) being difficult to make via traditional hydrosilylation routes, and 2) the acrylate group is prone to thermal polymerization during synthesis. This route is also limited in the polymer architecture available, there being only a limited number of silanol polymers; typically just linear silanol end-blocked polymers. When one of the alkoxy groups on the silane is condensed with the silanol fluid that only leaves two alkoxy groups available for condensation, which reduces the secondary cure speed. In polymers such as that illustrated above, the only design variable is the degree of polymerization (DP), denoted by subscript z. Silicone polymers made via this route also have a tendency to fragment due to a backbiting reaction caused by the condensation catalyst.

SUMMARY

A polymer comprises, per molecule, an average of more than one group of formula (I):

where Z is selected from the group consisting of one silicon atom, and a spacer group in which E, A, and R may be bonded to the same atom or different atoms in the spacer group; where group A comprises a unit of formula

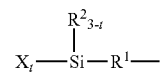

at a terminus;

group E comprises a unit of formula

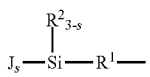

at a terminus;
each group R is independently selected from $R^1$, $R^2$, E, A, and a covalent bond; and
where each $R^1$ is independently an oxygen atom or a divalent hydrocarbon group; each $R^2$ is independently monovalent hydrocarbon group; each X is independently a monovalent hydrolyzable group; each J is independently a monovalent epoxy functional organic group; each subscript s independently has a value of 1, 2, or 3; and each subscript t independently has a value of 1, 2, or 3. In the polymer on average each group E is in close proximity to one or more of group A, and on average each group A is in close proximity one or more of group E. For purposes of this application, 'close proximity' means that the groups E and A are sufficiently near enough to one another to act as one crosslinking unit.

DETAILED DESCRIPTION

The polymer described herein may have the unit formula:

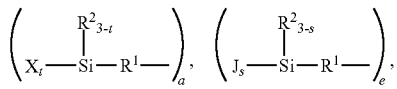

$(R^2{}_2SiO_{2/2})_b$, $(R^2SiO_{3/2})_c$, $(SiO_{4/2})_d$, $(R^{1'})_f$, and $(R^2{}_3SiO_{1/2})_g$. The sum of all units in the polymer may range from 50 to 2500, alternatively 50 to 1000. The ratio of subscript b to the quantity (a+b+c+d+e+f+g) may range from 0.8 to 0.999. Alternatively, this ratio may range from 0.93 to 0.98. Each polymer chain may have an average of at least 1 group of formula

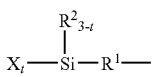

and at least one group of formula

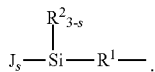

In the formulae above, each $R^1$ is independently an oxygen atom or a divalent organic group such as a divalent hydrocarbon group. Alternatively, each $R^1$ is a divalent hydrocarbon group. Each $R^{1'}$ is a divalent hydrocarbon group. Examples of suitable divalent hydrocarbon groups include alkylene groups such as ethylene, propylene, butylene, hexylene, octylene, and alternatively ethylene; and arylene groups such as phenylene, or an alkylarylene group such as:

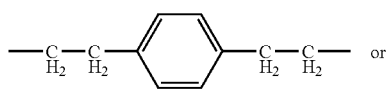 or

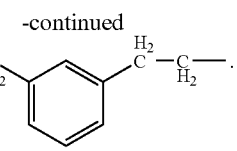

Alternatively, each $R^1$ and each $R^{1'}$ may be an alkylene group, such as ethylene.

In the formulae above, each $R^2$ is independently a monovalent organic group that is free of terminal aliphatic unsaturation (does not react by hydrosilylation). Examples of suitable groups for $R^2$ include substituted and unsubstituted monovalent hydrocarbon groups. Suitable unsubstituted monovalent hydrocarbon groups include alkyl such as methyl, ethyl, propyl, pentyl, hexyl, heptyl, octyl, undecyl, octadecyl, methylethyl, 1-methylpropyl, 2-methylpropyl, 1,1-dimethylethyl, 1-methylbutyl, 1-ethylpropyl, 2-methylbutyl, 3-methylbutyl, 1,2-dimethylpropyl, and 2,2-dimethylpropyl; cycloalkyl such as cyclopentyl, cyclohexyl, and methylcyclohexyl; and aryl such as phenyl, tolyl, xylyl, benzyl, and 2-phenylethyl. Examples of monovalent substituted hydrocarbon groups for $R^2$ include, but are not limited to, monovalent halogenated hydrocarbon groups such as chlorinated alkyl groups exemplified by chloromethyl and chloropropyl groups; fluorinated alkyl groups such as fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl; chlorinated cycloalkyl groups such as 2,2-dichlorocyclopropyl, 2,3-dichlorocyclopentyl; and fluorinated cycloalkyl groups such as 2,2-difluorocyclopropyl, 2,3-difluorocyclobutyl, 3,4-difluorocyclohexyl, and 3,4-difluoro-5-methylcycloheptyl. Examples of monovalent substituted hydrocarbon groups for $R^2$ include, but are not limited to, hydrocarbon groups substituted with oxygen atoms such as glycidoxyalkyl, and hydrocarbon groups substituted with nitrogen atoms such as aminoalkyl and cyano-functional groups such as cyanoethyl and cyanopropyl. Alternatively, each $R^2$ may be an alkyl group, such as a methyl group.

In the formulae above, each X is independently a monovalent hydrolyzable group. Suitable monovalent hydrolyzable groups include acyloxy groups, alkenyloxy, alkoxy groups, alkoxyalkoxy groups, hydroxyl groups, ketone groups, or a combination thereof. Suitable acyloxy groups are exemplified by acetoxy, octanoyloxy, and benzoyloxy. Suitable alkenyloxy groups are exemplified by isopropenyloxy and 1-ethyl-2-methylvinyloxy, isopropenyloxy, and 1-ethyl-2-methylvinyloxy. Suitable alkoxy groups are exemplified by methoxy, ethoxy, propoxy and butoxy, alternatively methoxy. Suitable alkoxyalkoxy groups are exemplified by methoxyethoxy, ethoxyethoxy, and methoxypropoxy.

In the formulae above, each J is independently a monovalent epoxy functional group. Examples of suitable epoxy functional groups include 3,4-epoxycyclohexyl; epoxyethyl (oxiranyl); epoxymethyl; glycidoxy; glycidoxyalkyl such as glycidoxymethyl, 2-glycidoxyethyl, 3-glycidoxypropyl and 4-glycidoxybutyl; epoxycyclohexylalkyl groups such as 4-methyl-3,4-epoxycyclohexyl, 2-(3,4-epoxycyclohexyl)ethyl, 3-(3,4-epoxycyclohexyl)propyl, 3,4-epoxy-4-methylcylohexyl, 2,3-epoxycylopentyl, and (2,3-epoxycylopentyl)methyl; and oxiranylalkyl such as 4-oxiranylbutyl and 8-oxiranyloctyl. Alternatively, each J may be a cycloaliphatic epoxy functional group. Examples of cycloaliphatic epoxy functional groups include:

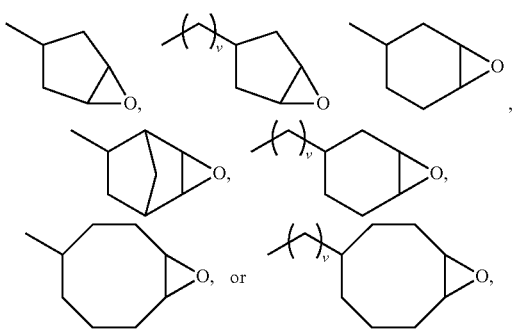

where each subscript v independently has a value ranging from 1 to 5.

The polymer comprises, per molecule, an average of more than one groups of formula (I):

(I)

The groups of formula (I) are spaced apart from one another in the polymer such that a polymerized network forms when a composition containing the polymer is cured via radiation cure, condensation cure, or a combination thereof. Without wishing to be bound by theory, it is thought that due to the presence of the groups of formula (I), the cured product has a similar general structure and strength regardless of which cure mechanism is used to cure the composition. Without wishing to be bound by theory, it is thought that the combination of 1) the close proximity of groups A and E to each other and 2) the distance between the groups of formula (I) provides this benefit. Alternatively, the groups of formula (I) may be spaced, on average, at least 30 units apart from all other groups of formula (I) in the polymer, and alternatively 50 to 1000 units apart from one another.

In the polymer described herein, substantially all of group X and group J are in formula (I). 'Substantially all of group X and group J are in formula (I)' means that either (i) no group X and no group J are bonded to a group that is not part of formula (I) in the polymer or (ii) the amounts of group X and/or group J bonded to a group that is not a part of formula (I) in the polymer do not affect the general structure and strength regardless of which cure mechanism (radiation or condensation) is used to cure a composition containing the polymer.

Z is selected from the group consisting of one silicon atom, and a spacer group in which E, A, and R may be bonded to the same atom or different atoms in the spacer group. R is selected from the group consisting of $R^1$, $R^2$, A, E, or a covalent bond. Alternatively, R may be A or E.

Group A comprises a unit of formula

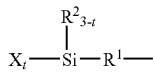

at a terminus and may further comprise 1 to 10 additional units. The additional units may comprise $R^2_2SiO_{2/2}$, $R^2SiO_{3/2}$, $SiO_{4/2}$, $R^2_3SiO_{1/2}$, $R^{1'}$, and combinations thereof. Alternatively, group A may comprise a unit of formula

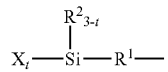

at a terminus and a unit of formula $R^{1'}$ at another terminus, where the unit

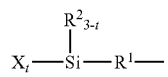

and the unit $R^{1'}$ are separated by the additional units. Alternatively, group A may have formula (II)

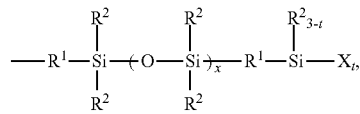

where subscript x has a value of 1 or more, alternatively 1 to 10. Alternatively, subscript x may have a value ranging from 1 to 5.

In these formulae $R^1$, $R^2$, X, and subscript t are as described above.

Group E comprises a unit of formula

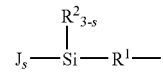

at a terminus and may further comprise 1 to 10 additional units. The additional units may comprise $R^2_2SiO_{2/2}$, $R^2SiO_{3/2}$, $SiO_{4/2}$, $R^2_3SiO_{1/2}$, $R^{1'}$, and combinations thereof. Group E may comprise a unit of formula

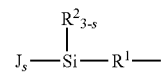

at a terminus and a unit of formula $R^{1'}$ at another terminus, where the unit

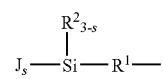

and the unit $R^{1'}$ are separated by the additional units. Alternatively, group E may have formula (III)

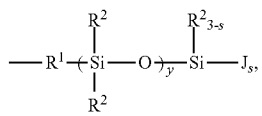

where subscript y has a value of 1 or more, alternatively 1 to 10. Alternatively, subscript y may have a value ranging from 1 to 5. In these formulae $R^1$, $R^2$, J, and subscript s are as described above.

Group R may be selected from the group consisting of A and E. When Z is one silicon atom and R is either A or E, group (I) is a monovalent group of formula

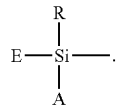

Alternatively, Z may be a spacer. Examples of suitable spacers include polyorganosiloxane groups having 3 to 25 silicon atoms. Groups E and A may be bonded to the same silicon atom or different silicon atoms in the spacer. When Z is a spacer, suitable groups of formula (I) may comprise two or more of units $R^2{}_2SiO_{2/2}$, $R^2SiO_{3/2}$, $SiO_{4/2}$, $R^{1'}$, $R^2{}_3SiO_{1/2}$, $(R^2{}_2)ESiO_{1/2}$, $(R^2{}_2)ASiO_{1/2}$, $(R^2)(E)(A)SiO_{1/2}$, $(R^2)ESiO_{2/2}$, $(A)ESiO_{2/2}$, $(R^2)ASiO_{2/2}$, $ESiO_{3/2}$, and $ASiO_{3/2}$ with the proviso that the spacer has at least one unit containing group A and at least one unit containing group E, where group A and group E may be bonded to the same silicon atom or to different silicon atoms in the spacer. In these formulae, $R^{1'}$, $R^2$, E, and A as described above.

An example of a polymer described herein has formula (IV):

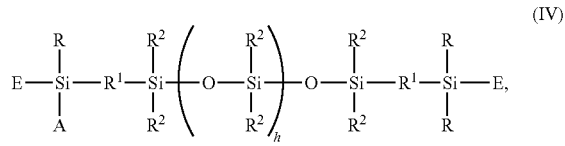
(IV)

where $R^1$, $R^2$, A, E, and R are as described above, and subscript h has a value ranging from 50 to 1000, alternatively 150 to 1000. In formula (IV), each R may be selected from the group consisting of A and E. In formula (IV), each $R^1$ may be an alkylene group, such as ethylene. In formula (IV), each $R^2$ may be an alkyl group, such as methyl. One skilled in the art would recognize that derivatives of formula (IV) may also be used in addition to, or instead of, the polymer of formula (IV). In an example of a derivative of formula (IV), the h units of formula $R^2{}_2SiO_{2/2}$ may be replaced by units comprising $(R^2{}_2SiO_{2/2})_{b'}$, $(R^2SiO_{3/2})_{c'}$, $(SiO_{4/2})_{d'}$, $(R^{1'})_{f'}$, $(R^2{}_3SiO_{1/2})_{g'}$, and combinations thereof, wherein the quantity (b'+c'+d'+f') may range from 50 to 1000, and g' has a value of 0 or more.

An alternative example of a polymer described herein has formula (V):

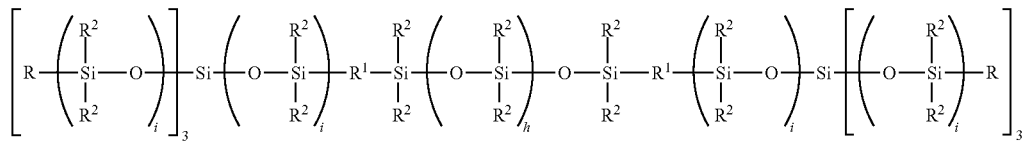

where $R^1$, $R^2$, A, E, R, and subscript h are as described above, and each subscript i has a value ranging from 1 to 10. In formula (V), each R may be selected from the group consisting of A and E. In formula (V), each $R^1$ may be an alkylene group, such as ethylene. In formula (V), each $R^2$ may be an alkyl group, such as methyl. One skilled in the art would recognize that derivatives of formula (V) may also be used in addition to, or instead of, the polymer of formula (V). In an example of a derivative of formula (V), the h units of formula $R^2{}_2SiO_{2/2}$ may be replaced by units comprising $(R^2{}_2SiO_{2/2})_{b''}$, $(R^2SiO_{3/2})_{c''}$, $(SiO_{4/2})_{d''}$, $(R^{1'})_{f''}$, $(R^2{}_3SiO_{1/2})_{g''}$, and combinations thereof, wherein the quantity (b''+c''+d''+f'')= 50 to 1000 and g'' has a value of 0 or more. In an alternative example of a derivative of formula (V), the i units of formula $R^2{}_2SiO_{2/2}$ may be replaced by units comprising $(R^2{}_2SiO_{2/2})_{b'''}$, $(R^2SiO_{3/2})_{c'''}$, $(SiO_{4/2})_{d'''}$, $(R^{1'})_{f'''}$, $(R^2{}_3SiO_{1/2})_{g'''}$, and combinations thereof, wherein the quantity (b'''+c'''+d'''+f''')= 1 to 25 and g''' has a value of 0 or more. In an alternative derivative of formula (V), both the h units of formula $R^2{}_2SiO_{2/2}$ and the i units of formula $R^2{}_2SiO_{2/2}$ may be replaced as described above.

An alternative example of a polymer described herein has formula (VI):

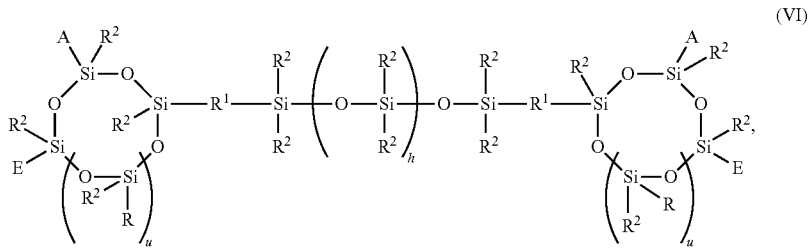
(VI)

where R, $R^1$, $R^2$, A, and E and subscript h are as described above. In formula (VI), each R may be selected from the group consisting of A and E. In formula (VI), each $R^1$ may be an alkylene group, such as ethylene. In formula (VI), each $R^2$ may be an alkyl group, such as methyl. In formula (VI), subscript u may have a value ranging from 0 to 22, alternatively 0 to 5. One skilled in the art would recognize that derivatives of formula (VI) may be used in addition to or instead of the polymer of formula (VI). In an example of a derivative of formula (VI), when u is greater than 0, then the silicon atoms to which group A and group E are bonded need not be adjacent in the ring. In an alternative derivative of formula (VI), groups A and E are bonded to the same silicon atom in the ring, and the remaining silicon bonded groups in the ring are $R^2$. In an alternative derivative of formula (VI), the h units of formula $R^2{}_2SiO_{2/2}$ may be replaced by units comprising $(R^2{}_2SiO_{2/2})_{b''''}$, $(R^2SiO_{3/2})_{c''''}$, $(SiO_{4/2})_{d''''}$, $(R^{1'})_{f''''}$, $(R^2{}_3SiO_{1/2})_{g''''}$, and combinations thereof, wherein the quantity (b''''+c''''+d''''+f'''') has a value ranging from 50 to 1000 and g'''' has a value of 0 or more.

Examples of the polymer described herein include the following structures. In these structures, h is as described above, 'Me' represents a methyl group, 'Et' represents an ethylene group, and 'Epchex' represents an epoxycyclohexylethyl group.

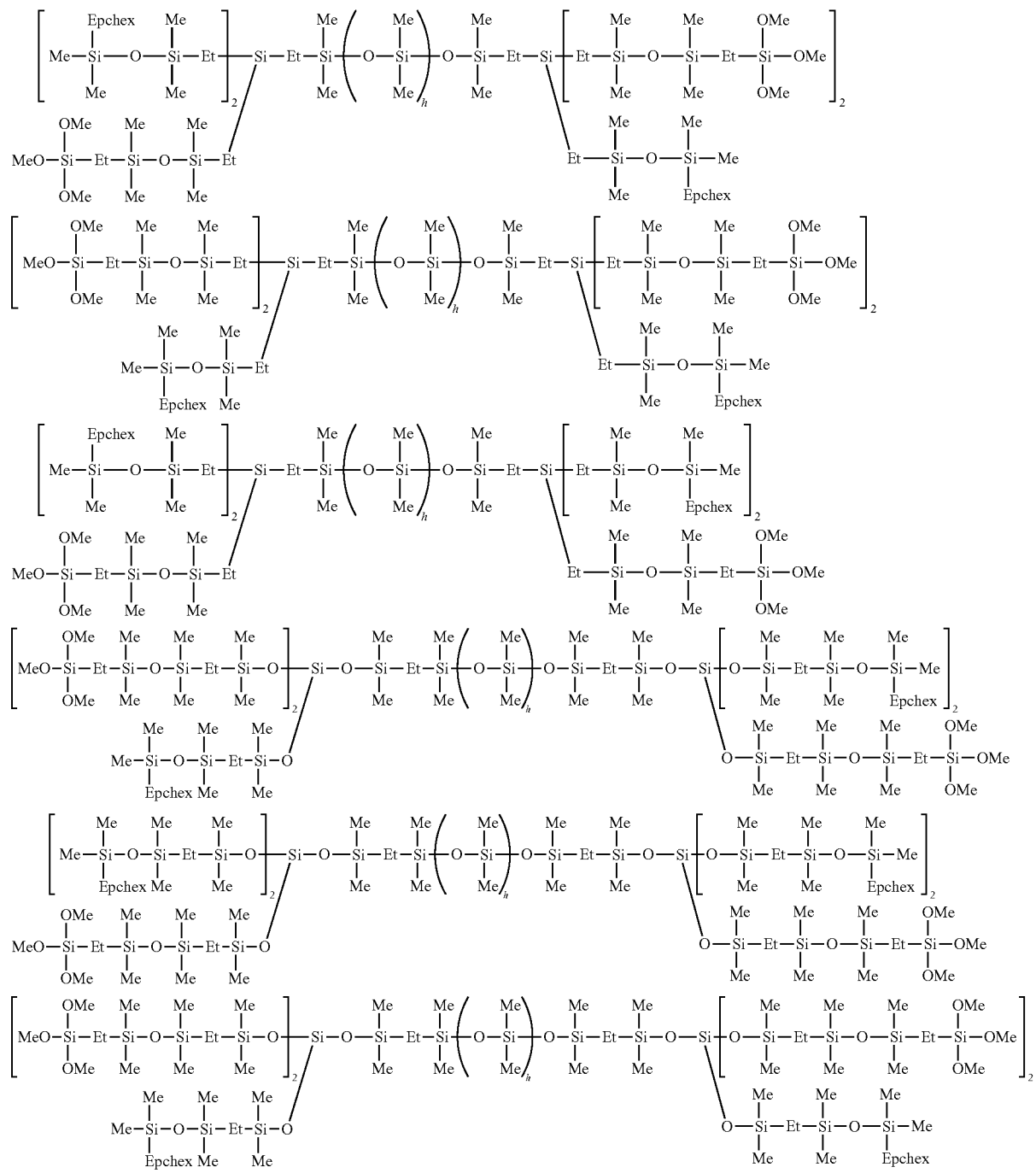

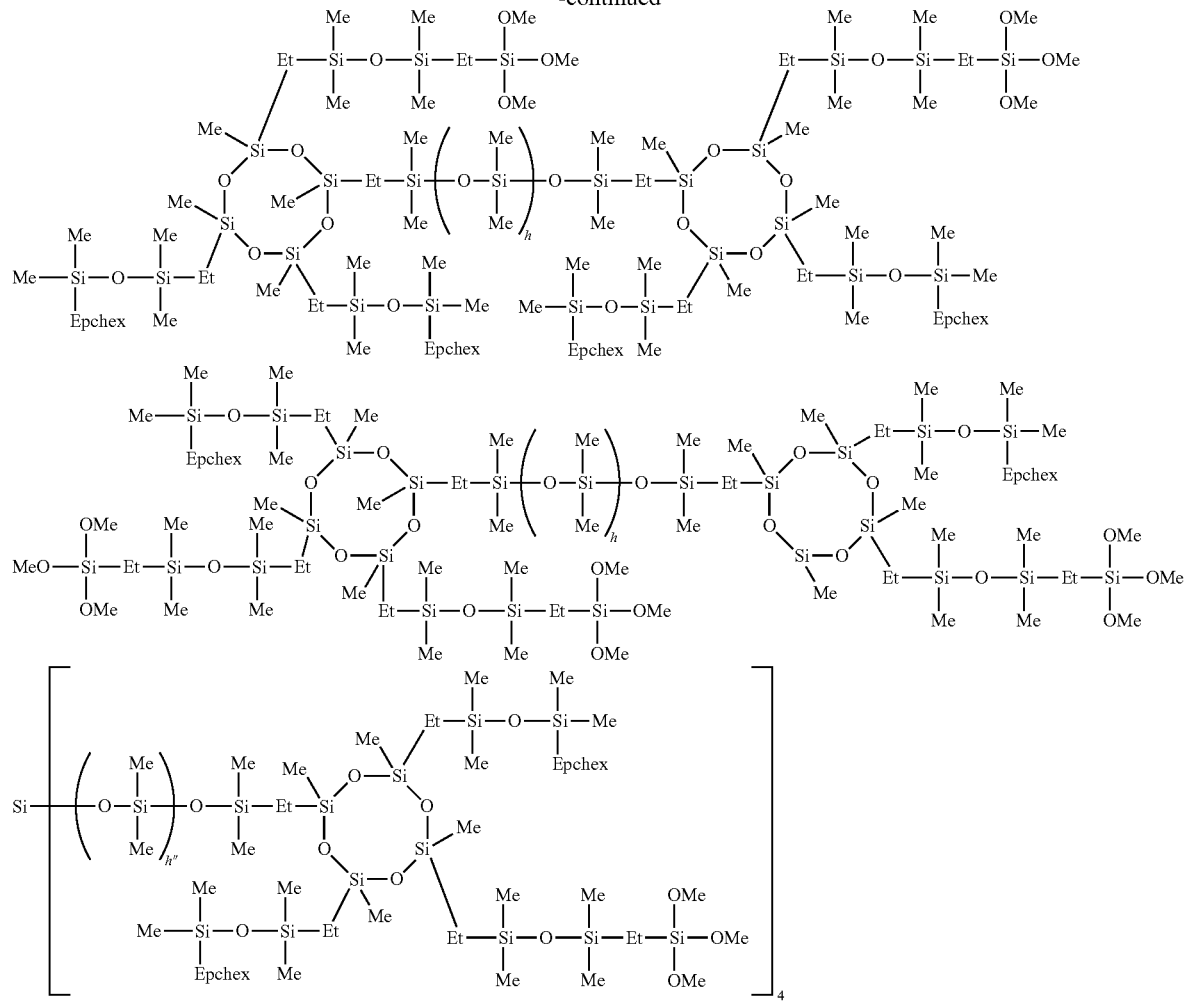

where h″ has a value ranging from 25 to 250.

Method of Making the Polymer

The polymer described above may be prepared by combining ingredients comprising:

(A) a polyorganohydrogensiloxane having an average, per molecule, of one silicon-bonded hydrogen atom and one to three terminal hydrolyzable groups, where the silicon-bonded hydrogen atom and the hydrolyzable groups are bonded to different silicon atoms in the polyorganohydrogensiloxane;

(B) a polyorganohydrogensiloxane having an average, per molecule, of one silicon-bonded hydrogen atom and one to three terminal radiation curable groups, where the silicon bonded hydrogen atom and the radiation curable groups are bonded to different silicon atoms in the polyorganohydrogensiloxane; and (C) an organofunctional polymer having an average, per molecule, of at least 4 terminal aliphatically unsaturated organic groups; and (D) a hydrosilylation catalyst.

The ingredients used to make the polymer, and the resulting polymer itself, may be free of amine, amide, acrylate, and oxime containing groups. Without wishing to be bound by theory, it is thought that these amine, amide, acrylate, and oxime containing groups may render the polymer difficult to make by this method, the acrylate group may be prone to polymerization during the method, or both. "Free of amine amine, amide, acrylate, and oxime containing groups" means that the ingredients have no or sufficiently low amounts of organic groups that contain amine, amide, acrylate, and oxime functionalities such that the polymer will form by the method described herein.

Ingredient (A) Polyorganohydrogensiloxane with Terminal Hydrolyzable Groups

Ingredient (A) comprises a unit of formula

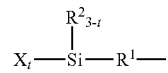

at a terminus and a silicon bonded hydrogen atom at another terminus. The unit

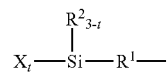

and the hydrogen atom may be separated by 1 to 10 additional units. The additional units separating

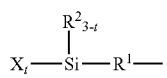

and the hydrogen atom may comprise $R^2_2SiO_{2/2}$, $R^2SiO_{3/2}$, $SiO_{4/2}$, $R^2_3SiO_{1/2}$, $R^{1'}$, or combinations thereof. Alternatively, ingredient (A) may have formula (VII):

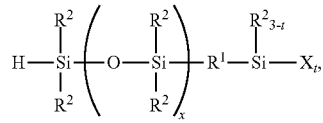 (VII)

where $R^1$, $R^{1'}$, $R^2$, X, and subscripts t and x are as described above. The amount of ingredient (A) added may range from 0.05 mole to 0.5 mole per mole of group $R^3$ in ingredient (C). Ingredient (A) and methods for its preparation are known in the art. For example, U.S. Pat. No. 4,772,675 to Klosowski, et al. discloses examples of ingredient (A) and methods for their preparation. (However, U.S. Pat. No. 4,772,675 does not disclose the polymers described herein.) Briefly stated, the method comprises reacting an alkenyl functional silane having 3 hydrolyzable groups with a polyorganosiloxane terminated with silicon bonded hydrogen atoms. Greater than two moles of the polyorganosiloxane are combined with 1 mole of the silane and a hydrosilylation catalyst, such as that described below. The resulting product may optionally then be distilled.

Ingredient (B) Polyorganohydrogensiloxane with Radiation Curable Groups

Ingredient (B) comprises a unit of formula

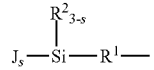

at a terminus and a silicon bonded hydrogen atom at another terminus, where the unit

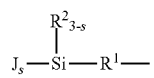

and the hydrogen atom may be separated by 1 to 10 additional units. The additional units separating the unit

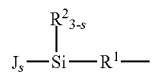

and the hydrogen atom may comprise $R^2_2SiO_{2/2}$, $R^2SiO_{3/2}$, $SiO_{4/2}$, $R^2_3SiO_{1/2}$, $R^{1'}$, or combinations thereof. Alternatively, ingredient (B) may have formula (VIII):

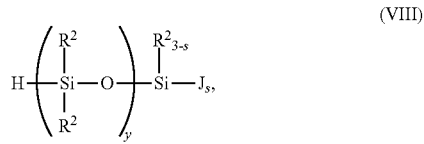 (VIII)

where $R^2$, J, and subscripts s and y are as described above. The amount of ingredient (B) added may range from 0.5 mole to 0.95 mole per mole of group $R^3$ ingredient (C). The relative molar amounts of ingredient (B) to ingredient (A) added to the composition may range from (80):(20) to (50):(50). Ingredient (B) and methods for its preparation are known in the art. For example, U.S. Pat. No. 5,484,950 to Crivello discloses ingredient (B) and methods for its preparation. (However, U.S. Pat. No. 5,484,950 does not disclose the polymers described herein.) Briefly stated, the method of U.S. Pat. No. 5,484,950 comprises combining a dihydrosiloxane, an olefin having a radiation curable group such as an epoxy-functional group, and a hydrosilylation catalyst in a solvent and heating. Thereafter, the catalyst is deactivated and the resulting mixture is distilled.

Ingredient (C) Organofunctional Polymer with Multiple Aliphatically Unsaturated Groups Ingredient (C) may be an organic polymer, a polyorganosiloxane, or a siloxane-organic co-polymer. Alternatively, ingredient (C) may be a polyorganosiloxane.

Ingredient (C) may have formula (IX):

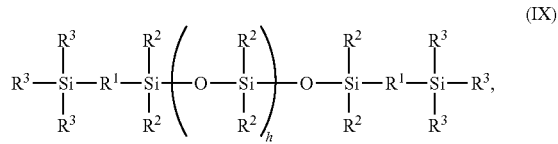 (IX)

and derivatives thereof, where $R^1$, $R^2$, and subscript h are as described above, and each $R^3$ is independently an organic group having terminal aliphatic unsaturation. $R^3$ is exemplified by acrylate functional groups; methacrylate functional groups; alkenyl groups such as vinyl, allyl, propenyl, and butenyl; alkynyl groups such as ethynyl, propynyl, and butynyl; and arylalkenyl, such as styryl. Alternatively, each $R^3$ may be an alkenyl group, such as vinyl. The compound of formula (IX) may be prepared by methods known in the art by reacting a linear polyorganohydrogensiloxane with tetravinylsilane in the presence of a hydrosilylation catalyst.

Alternatively, ingredient (C) may have formula (X):

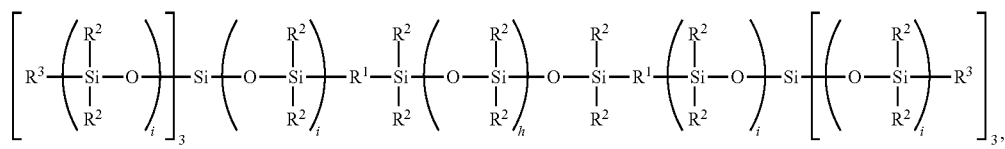

and derivatives thereof, where $R^1$, $R^2$, $R^3$, subscript h, and subscript i are as described above.

Formula (X) may be prepared by reacting, in the presence of a hydrosilylation catalyst, a dihydrosiloxane (a polydiorganosiloxane having one hydrogen atom at each terminus) with a resin of formula (XI):

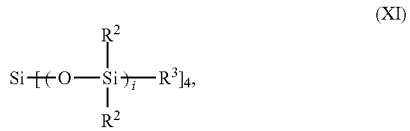

where
$R^1$, $R^2$, $R^3$, and subscript i are as described above.

Alternatively, ingredient (C) may have formula (XII):

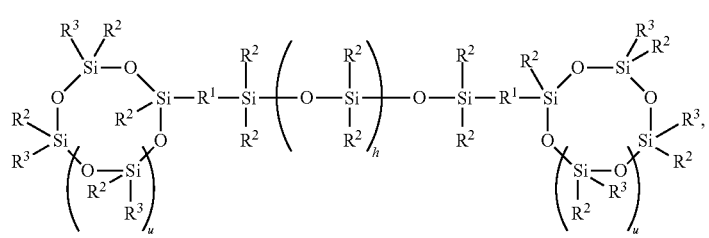

or derivatives thereof, where $R^1$, $R^2$, $R^3$, subscript h, and subscript u are as described above. One skilled in the art would recognize that derivatives of formula (XII) may be used, for example, when u is greater than 0, then the silicon atoms to which the $R^3$ groups are bonded need not be adjacent in the ring. In an alternative derivative of formula (XII), two $R^3$ groups are bonded to the same silicon atom in the ring, and the remaining silicon bonded groups in the ring are $R^2$. Formula (XII) can be prepared by methods known in the art such as reacting a polyorganohydrogensiloxane with methyl vinyl cyclic siloxane in the presence of a hydrosilylation catalyst.

Ingredient (D) Hydrosilylation Catalyst

Ingredient (D) is a hydrosilylation catalyst. Ingredient (D) is added in an amount ranging from 0.1 to 1000 ppm of platinum group metal, alternatively 1 to 500 ppm, alternatively 2 to 200, alternatively 5 to 150 ppm, based on the weight of ingredients (A), (B), and (C) combined.

Suitable hydrosilylation catalysts are known in the art and commercially available. Ingredient (D) may comprise a platinum group metal selected from platinum, rhodium, ruthenium, palladium, osmium or iridium metal or organometallic compound thereof, or a combination thereof. Ingredient (D) is exemplified by compounds such as chloroplatinic acid, chloroplatinic acid hexahydrate, platinum dichloride, and complexes of said compounds with low molecular weight organopolysiloxanes or platinum compounds microencapsulated in a matrix or coreshell type structure. Complexes of platinum with low molecular weight organopolysiloxanes include 1,3-diethenyl-1,1,3,3-tetramethyldisiloxane complexes with platinum. Alternatively, the catalyst may comprise 1,3-diethenyl-1,1,3,3-tetramethyldisiloxane complex with platinum. When the catalyst is a platinum complex with a low molecular weight organopolysiloxane, the amount of catalyst may range from 0.04% to 0.4% based on the weight of the curable silicone composition.

Suitable hydrosilylation catalysts for ingredient (D) are described in, for example, U.S. Pat. Nos. 3,159,601; 3,220,972; 3,296,291; 3,419,593; 3,516,946; 3,814,730; 3,989,668; 4,784,879; 5,036,117; and 5,175,325 and EP 0 347 895 B.

Uses for the Polymer

The polymer described above may be formulated into a composition. The composition comprises:
(a) the polymer described above, and
(b) a photoinitiator.

The photoinitiator may be any conventional photoinitiator for radiation curable silicone compositions known in the art, such as those disclosed in U.S. Pat. No. 4,310,469 to Crivello and U.S. Pat. No. 4,313,988 to Koshar, et al. and European Patent Application No. EP 0 562 922. The photoinitiator may comprise a cationic photoinitiator. The cationic photoinitiator can be any cationic photoinitiator capable of initiating cure (cross-linking) of the polymer upon exposure to radiation having a wavelength ranging from 150 to 800 nm. Examples of cationic photoinitiators include, but are not limited to, onium salts.

Suitable onium salts include salts having a formula selected from $R^4_2 I^+ MG_w^-$, $R^4_3 S^+ MG_w^-$, $R^4_3 Se^+ MG_w^-$, $R^4_4 P^+ MG_w^-$, and $R^4_4 N^+ MG_w^-$, where each $R^4$ is independently a substituted or unsubstituted monovalent hydrocarbon group having from 1 to 30 carbon atoms; M is an element selected from transition metals, rare earth metals, lanthanide metals, metalloids, phosphorus, and sulfur; G is a halo (e.g., chloro, bromo, iodo), and w has a value such that the product w (charge on G+oxidation number of M)=−1. Examples of substituents on the hydrocarbon group include, but are not limited to, $C_1$ to $C_8$ alkoxy, $C_1$ to $C_{16}$ alkyl, nitro, chloro, bromo, cyano, carboxyl, mercapto, and heterocyclic aromatic groups, such as pyridyl, thiophenyl, and pyranyl. Examples of metals represented by M include, but are not limited to, transition metals, such as Fe, Ti, Zr, Sc, V, Cr, and Mn; lanthanide metals, such as Pr, and Nd; other metals, such as Cs, Sb, Sn, Bi, Al, Ga, and In; metalloids, such as B, and As; and P. The formula $MG_w^-$ represents a non-basic, non-nucleophilic anion. Examples of anions having the formula $MG_w^-$ include, but are not limited to, $BF_4^-$, $PF_6^-$, $AsF_6^-$, $SbF_6^=$, $SbCl_6^-$, and $SnCl_6^-$.

Examples of onium salts include, but are not limited to, bis-diaryliodonium salts such as bis(dodecylphenyl)iodonium salts exemplified by bis(dodecyl phenyl)iodonium hexafluoroarsenate and bis(dodecylphenyl)iodonium hexafluoroantimonate; alkylphenyliodonium salts such as alkylphenyliodonium hexafluoroantimonate; diaryliodonium salts of sulfonic acids, triarylsulfonium salts of sulfonic acids, diaryliodonium salts of boronic acids, and triarylsulfonium salts of boronic acids.

Examples of diaryliodonium salts of sulfonic acids include, but are not limited to, diaryliodonium salts of perfluoroalkylsulfonic acids, such as diaryliodonium salts of perfluorobutanesulfonic acid, diaryliodonium salts of perfluoroethanesulfonic acid, diaryliodonium salts of perfluorooctanesulfonic acid, and diaryliodonium salts of trifluoromethanesulfonic acid; and diaryliodonium salts of aryl sulfonic acids, such as diaryliodonium salts of para-toluenesulfonic acid, diaryliodonium salts of dodecylbenzenesulfonic acid, diaryliodonium salts of benzenesulfonic acid, and diaryliodonium salts of 3-nitrobenzenesulfonic acid.

Examples of triarylsulfonium salts of sulfonic acids include, but are not limited to, triarylsulfonium salts of perfluoroalkylsulfonic acids, such as triarylsulfonium salts of perfluorobutanesulfonic acid, triarylsulfonium salts of perfluoroethanesulfonic acid, triarylsulfonium salts of perfluorooctanesulfonic acid, and triarylsulfonium salts of trifluoromethanesulfonic acid; and triarylsulfonium salts of aryl sulfonic acids, such as triarylsulfonium salts of para-toluenesulfonic acid, triarylsulfonium salts of dodecylbenzenesulfonic acid, triarylsulfonium salts of benzenesulfonic acid, and triarylsulfonium salts of 3-nitrobenzenesulfonic acid.

Examples of diaryliodonium salts of boronic acids include, but are not limited to, diaryliodonium salts of perhaloarylboronic acids. Examples of triarylsulfonium salts of boronic acids include, but are not limited to, triarylsulfonium salts of perhaloarylboronic acid.

The cationic photoinitiator can be a single cationic photoinitiator or a combination comprising two or more different cationic photoinitiators, each as described above. The concentration of the cationic photoinitiator may range from 0.01% to 15%, alternatively from 0.1% to 5%, and alternatively 0.1% to 2%, based on the weight of the composition.

Additional Ingredients

The composition may optionally further comprise one or more additional ingredients. Examples of the additional ingredients include (c) a filler, (d) a filler treating agent, (e) solvent, (f) a condensation reaction catalyst, (g) an adhesion promoter, (h) a colorant (e.g., dye or pigment), (i) a reactive diluent (i.e., a solvent that reacts with a functional group on ingredient (a) such as alcohol, epoxy, vinyl ether, anhydride, or oxetane), (j) a radical generator (e.g., peroxide), (k) a shelf life extender, (l) an antioxidant, (m) a crosslinker, (n) a corrosion inhibitor, or a combination thereof.

Ingredient (c) is a filler that may optionally be added to the composition in an amount ranging from 0.1% to 20% based on the weight of the compositions. Examples of suitable reinforcing and extending fillers include fumed silica, precipitated silica, quartz, ground calcium carbonate, precipitated calcium carbonate, magnesium carbonate, iron oxide, titanium dioxide, diatomaceous earth, aluminum oxide, aluminum hydroxide, zinc oxide, zinc carbonate.

The filler may optionally be treated with ingredient (d) a surface treating agent such as an organoalkoxysilane exemplified by methyltrimethoxysilane, methyltriethoxysilane, n-octyltrimethoxysilane, n-octyltriethoxysilane, and a combination thereof; an organohalosilane exemplified by trimethylchlorosilane; an organosilazane such as hexamethyldisilazane; an organosiloxane oligomer such as hydroxy-terminated dimethylsiloxane oligomer, hydroxy-terminated methylphenylsiloxane oligomer, hydroxy-terminated methylvinylsiloxane oligomer, and a combination thereof. The filler may be treated a priori or in situ, for example, by mixing the treating agent with the filler before or after mixing the filler with other ingredients of the composition. The amount of ingredient (d) may range from 0.001% to 2% based on the weight of the composition.

The composition may optionally further comprise ingredient (e) a solvent. Suitable solvents are exemplified by organic solvents such as toluene, xylene, acetone, methylethylketone, methyl isobutyl ketone, hexane, heptane, and a combination thereof; and non-crosslinkable silicone solvents such as trimethylsiloxy-terminated polydimethylsiloxanes, trimethylsiloxy-terminated polymethylphenylsiloxanes, and a combination thereof. The amount of ingredient (e) may range from 0.001% to 90% based on the weight of the composition.

The composition may optionally further comprise ingredient (f) a condensation reaction catalyst. The condensation reaction catalyst may be a Lewis acid; a primary, secondary, or tertiary organic amine; a metal oxide; a titanium compound; a tin compound; a zirconium compound; or a combination thereof. Ingredient (f) may comprise a carboxylic acid salt of a metal ranging from lead to manganese inclusive in the electromotive series of metals. Alternatively, ingredient (f) may comprise a chelated titanium compound, a titanate such as a tetraalkoxytitanate, or a combination thereof. Examples of suitable titanium compounds include, but are not limited to, diisopropoxytitanium bis(ethylacetoacetate), tetrabutoxy titanate, tetrabutyltitanate, tetraisopropyltitanate, and bis(ethoxyacetoacetonate)diisopropoxy titanium (IV), and a combination thereof. Alternatively ingredient (f) may comprise a tin compound such as dibutyltin diacetate, dibutyltin dilaurate, dibutyl tin oxide, stannous octoate, tin oxide, or a combination thereof.

Examples of condensation reaction catalysts are known in the art and are disclosed in U.S. Pat. Nos. 4,962,076; 5,051,455; 5,053,442; 4,753,977 at col. 4, line 35 to col. 5, line 57; and U.S. Pat. No. 4,143,088 at col. 7, line 15 to col. 10, line 35. The amount of ingredient (f) depends on various factors including the type of catalyst selected and the choice of the remaining ingredients in the composition, however the amount of ingredient (f) may range from 0.001% to 5% based on the weight of the composition.

Ingredient (g) is an adhesion promoter. Examples of suitable adhesion promoters include an alkoxysilane such as an epoxy-functional alkoxysilane, or a mercapto-functional compound; a combination of an alkoxysilane and a hydroxy-functional polyorganosiloxane; a mercapto-functional compound; an unsaturated compound; an epoxy-functional silane; an epoxy-functional siloxane; a combination, such as a reaction product, of an epoxy-functional silane or epoxy-functional siloxane and a hydroxy-functional polyorganosiloxane; or a combination thereof. The amount of adhesion promoter added to the composition depends on various factors including the specific adhesion promoter selected, the other ingredients of the composition, and the end use of the composition, however, the amount may range from 0.1% to 5% based on the weight of the composition.

Ingredient (g) can be an unsaturated or epoxy-functional compound. Suitable epoxy-functional compounds are known in the art and commercially available, see for example, U.S. Pat. Nos. 4,087,585; 5,194,649; 5,248,715; and 5,744,507 col. 4-5. Ingredient (g) may comprise an unsaturated or epoxy-functional alkoxysilane. For example, the functional alkoxysilane can have the formula $R^5_j Si(OR^6)_{(4-j)}$, where subscript j is 1, 2, or 3, alternatively j is 1.

Each $R^5$ is independently a monovalent organic group with the proviso that at least one $R^5$ is an unsaturated organic group or an epoxy-functional organic group. Epoxy-functional organic groups for $R^5$ are exemplified by 3-glycidoxypropyl and (epoxycyclohexyl)ethyl. Unsaturated organic groups for $R^5$ are exemplified by 3-methacryloyloxypropyl, 3-acryloyloxypropyl, and unsaturated monovalent hydrocarbon groups such as vinyl, allyl, hexenyl, undecylenyl.

Each $R^6$ is independently an unsubstituted, saturated hydrocarbon group of at least 1 carbon atom. $R^6$ may have up to 4 carbon atoms, alternatively up to 2 carbon atoms. $R^6$ is exemplified by methyl, ethyl, propyl, and butyl.

Examples of suitable epoxy-functional alkoxysilanes include 3-glycidoxypropyltrimethoxysilane, 3-glycidoxypropyltriethoxysilane, (epoxycyclohexyl)ethyldimethoxysilane, (epoxycyclohexyl)ethyldiethoxysilane and combinations thereof. Examples of suitable unsaturated alkoxysilanes include vinyltrimethoxysilane, allyltrimethoxysilane, allyltriethoxysilane, hexenyltrimethoxysilane, undecylenyltrimethoxysilane, 3-methacryloyloxypropyl trimethoxysilane, 3-methacryloyloxypropyl triethoxysilane, 3-acryloyloxypropyl trimethoxysilane, 3-acryloyloxypropyl triethoxysilane, and combinations thereof. Alternatively, examples of suitable adhesion promoters include glycidoxypropyltrimethoxysilane and a combination of glycidoxypropyltrimethoxysilane with an aluminum chelate or zirconium chelate.

Ingredient (g) may comprise an epoxy-functional siloxane such as a reaction product of a hydroxy-terminated polyorganosiloxane with an epoxy-functional alkoxysilane, as described above, or a physical blend of the hydroxy-terminated polyorganosiloxane with the epoxy-functional alkoxysilane. Ingredient (g) may comprise a combination of an epoxy-functional alkoxysilane and an epoxy-functional siloxane. For example, ingredient (g) is exemplified by a mixture of 3-glycidoxypropyltrimethoxysilane and a reaction product of hydroxy-terminated methylvinylsiloxane with 3-glycidoxypropyltrimethoxysilane, or a mixture of 3-glycidoxypropyltrimethoxysilane and a hydroxy-terminated methylvinylsiloxane, or a mixture of 3-glycidoxypropyltrimethoxysilane and a hydroxy-terminated methylvinyl/dimethylsiloxane copolymer. When used as a physical blend rather than as a reaction product, these components may be stored separately in multiple-part kits.

Suitable mercapto-functional compounds include an organomercaptan, a mercapto containing silane, or a combination thereof. Suitable mercapto containing silanes include 3-mercaptopropyltrimethoxysilane. Suitable mercapto-functional compounds are disclosed in U.S. Pat. No. 4,962,076.

Ingredient (h) is a colorant (e.g., dye or pigment). Examples of suitable colorants include carbon black and Stan-Tone 50SP01 Green (which is commercially available from PolyOne). Examples of colorants are known in the art and are disclosed in U.S. Pat. Nos. 4,962,076; 5,051,455; and 5,053,442. The amount of colorant added to the composition depends on various factors including the other ingredients of the composition, however, the amount may range from 0.001% to 20% based on the weight of the composition.

Ingredient (i) is a radical generator. Examples of suitable radical generators include peroxides. The amount of radical generator added to the composition depends on various factors including the other ingredients of the composition, however, the amount may range from 0.1% to 10% based on the weight of the composition.

Ingredient (j) is a reactive diluent. Ingredient (j) may be a solvent that reacts with a functional group on ingredient (a) such as an acrylate, an alcohol, an anhydride such as a maleic anhydride, an epoxy such as a monofunctional epoxy compound, an oxetane, a vinyl acetate, a vinyl ester, a vinyl ether, a fluoro alkyl vinyl ether, a vinyl pyrrolidone such as N-vinyl pyrrolidone, a styrene, or a combination thereof.

Examples of suitable alcohols include ethanol, butanol, hexanol, decanol, and combinations thereof. Examples of suitable epoxy compounds include glycidyl ethers such as butyl glycidyl ether, cresyl glycidyl ether, aliphatic glycidyl ether, 2-ethylhexyl glycidyl ether, and glycidyl ether of cyclohexane dimethanol; and difunctional reactive diluents based on neopentyl glycol and diglycidyl ether of 1,4-butanediol. These epoxy compounds are known in the art and commercially available from Air Products under the tradenames EPODIL® 741, 742, 746, 747, 748, 749, 750, 751, 757, and 759. Other epoxy compounds suitable as reactive diluents are available from Hexion Specialty Chemicals, Inc. of Houston, Tex., USA under the tradename Heloxy Modifiers 7, 8, 61, and 116. Examples of suitable vinyl ethers include, but are not limited to butanediol divinyl ether, cyclohexanedimethanol divinyl ether, cyclohexanedimethanol monovinyl ether, cyclohexyl vinyl ether, diethyleneglycol divinyl ether, diethyleneglycol monovinyl ether, dodecyl vinyl ether, ethyl vinyl ether, hydroxybutyl vinyl ether, isobutyl vinyl ether, isopropyl vinyl ether, n-butyl vinyl ether, n-propyl vinyl ether, octadecyl vinyl ether, triethyleneglycol divinyl ether, and combinations thereof. Vinyl ethers are known in the art and commercially available from BASF AG of Germany. The amount of ingredient (j) depends on various factors such as the specific reactive diluent selected, but the amount may range from 0.5 to 50% based on the weight of composition.

Ingredient (n) is a corrosion inhibitor. Examples of suitable corrosion inhibitors include benzotriazole, mercaptabenzotriazole and commercially available corrosion inhibitors such as 2,5-dimercapto-1,3,4-thiadiazole derivative (CUVAN® 826) and alkylthiadiazole (CUVAN® 484) from R. T. Vanderbilt of Norwalk, Conn., U.S.A. The amount of ingredient (n) may range from 0.05% to 0.5% based on the weight of the composition.

The composition may be prepared by combining the polymer and the photoinitiator, and any additional ingredients in the stated proportions at ambient temperature. Combining may be performed by mixing by any of the techniques known in the art such as milling, blending, and stirring, either in a batch or continuous process. The particular device is determined by the viscosity of the ingredients and the viscosity of the composition to be produced.

The composition may be used, for example to prepare a coating on a substrate. Alternatively, the composition may be used as a sealant, e.g., for filling gaps on a substrate. Alternatively, the composition may be used as an adhesive, for example, to adhere substrates together. The composition may be used to adhere a first substrate, such as an electronic device, to a second substrate, such as a circuit board. A method of using the composition described above comprises:

(i) applying the composition to a substrate, and
(ii) curing the composition.

The substrate can be any rigid or flexible material having a planar, complex, or irregular contour. The substrate can be transparent or nontransparent to light in the visible region (400 to 700 nm) of the electromagnetic spectrum. Also, the substrate can be an electrical conductor, semiconductor, or nonconductor. Moreover, the substrate can be an electronic device, such as a discrete device or an integrated circuit.

Examples of substrates include, but are not limited to, semiconductors such as silicon, silicon having a surface layer of silicon dioxide, silicon carbide, indium phosphide, and gallium arsenide; quartz; fused quartz; aluminum oxide; ceramics; glass; metal foils; polyolefins such as polyethylene, polypropylene, polystyrene, polyethylene terephthalate (PET), and polyethylene naphthalate; fluorocarbon polymers such as polytetrafluoroethylene and polyvinylfluoride; polyamides such as Nylon; polyimides; polyesters such as poly(methyl methacrylate); epoxy resins; polyethers; polycarbonates; polysulfones; and polyether sulfones.

Examples of discrete devices include, but are not limited to, diodes, such as PIN diodes, voltage reference diodes, varactor diodes, Avalanche diodes, DIACs, Gunn diodes, Snap diodes, IMPATT diodes, tunnel diodes, Zener diodes, normal (p-n) diodes, and Shottky diodes; transistors, such as bipolar transistors, including, Insulated gate bipolar transistors (IGBTs) and Darlington transistors, and field-effect transistors (FETs), including metal oxide semiconductor FETs (MOSFETs), junction FETs (JFETs), metal-semiconductor FETs (MESFETs), organic FETs, high electron mobility transistor (HEMTs), and thin film transistors (TFTs), including organic field effect transistors; thyristors, for example, DIACs, TRIACs, and silicon controlled rectifiers (SCRs), distributed buffer-gate turn-off (DB-GTO) thyristors, gate turn-off (GTO) thyristors, MOFSET controlled thyristors (MCTs), modified anode-gate turn-off (MA-GTO) thyristors, static induction thyristors (SIThs), and field controlled thyristors (FCThs); varistors; resistors; condensers; capacitors; thermistors; and optoelectronic devices, such as photodiodes, solar cells (for example CIGS solar cells and organic photovoltaic cells), phototransistors, photomultipliers, integrated optical circuit (IOC) elements, light-dependent resistors, laser diodes, light-emitting diodes (LEDs), and organic light-emitting diodes (OLEDs), including small-molecule OLEDs (SM-OLEDs) and polymer light-emitting diodes (PLEDs).

Examples of integrated circuits include, but are not limited to, monolithic integrated circuits, such as memory ICs, including RAM (random-access memory), including DRAM and SRAM, and ROM (read-only memory); logic circuits; analog integrated circuits; hybrid integrated circuits, including thin-film hybrid ICs and thick-film hybrid ICs; thin film batteries; and fuel cells.

The composition is applied on at least a portion of the substrate. The composition can be a continuous coating on a portion of the substrate, a continuous coating on the entire substrate, or a discontinuous coating. Moreover, the discontinuous coating can form a regular or irregular pattern on the substrate.

The composition can be applied on the substrate using conventional methods, including spin-coating; dip-coating; spraying; brushing; and printing, such as screen printing and stencil printing. For example, the silicone composition can be applied by spin coating at a speed ranging from 200 to 5,000 rpm for 5 to 60 s. The spin speed, spin time, and viscosity of the composition can be adjusted so that the resulting coating produced has the desired thickness.

Step (ii) may be performed by exposing the composition to ultra-violet radiation or atmospheric moisture, or both. Alternatively, step (ii) may be performed by exposing the composition to heat or atmospheric moisture, or both.

Exposing the composition to ultra-violet radiation may be performed by any conventional means, such as using light sources exemplified by an ultra-high pressure mercury lamp, high-pressure mercury lamp, low-pressure mercury lamp, xenon-mercury lamp, or metal halide lamp. The conditions used may be such that the amount of radiation at 254 nm ranges from 0.01 to 10 J/cm$^2$. Alternatively, the composition can be cured by exposure to radiation having a wavelength ranging from 150 to 800 nm, alternatively from 250 to 400 nm, at a dosage sufficient to cure (cross-link) the polymer. The dose of radiation may range from 50 to 1,000 mJ/cm$^2$, alternatively from 200 to 500 mJ/cm$^2$. An optical filter (for UV radiation exposure at a specified wavelength) may optionally be installed on the light source.

Since J in the formulae described above is an epoxy functional group, particularly when J is a cycloaliphatic epoxy group, the polymer is cationically curable as the primary UV cure mechanism. Without wishing to be bound by theory, it is thought that because cationic epoxies are not inhibited by oxygen, this may provide the benefits of improved process requirements because cationic systems have an intrinsic secondary cure mechanism, in that the cationic cure continues into unirradiated segments under ambient as well as at elevated temperatures. In certain applications where this inherent ambient secondary cure is too slow to be commercially practical using prior art compositions, the polymer described herein may allow fine tuning of both the UV and moisture cure speeds (independently of one another) as well as the physical properties.

EXAMPLES

These examples are included to demonstrate the invention to those of ordinary skill in the art. However, those of skill in the art should, in light of the present disclosure, appreciate that many changes can be made in the specific embodiments which are disclosed and still obtain a like or similar result without departing from the spirit and scope of the invention set forth in the claims. All amounts, ratios, and percentages are by weight unless otherwise indicated.

Example 1

Preparation of a Polymer

A polymer was prepared by mixing the following ingredients. In these formula, Me, Et, and Epchex are as defined above, and Vi represents a vinyl group.

Ingredient (A1) was

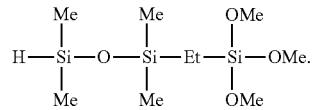

Ingredient (B1) was

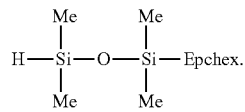

Ingredient (C1) was

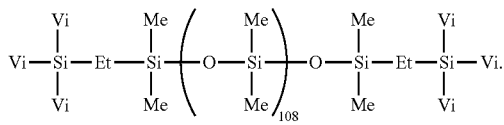

Ingredient (D1) was a platinum catalyst. In this example, 4 moles of ingredient (A1) and 2 moles of ingredient (B1) per mole of ingredient (C1) were used. A catalytic (ppm level) amount of ingredient (D1) was used.

Example 2

Preparation of a Polymer

A polymer was prepared by mixing the following ingredients. In these formula, Me, Et, and EpH are as defined above, and Vi represents a vinyl group.

Ingredient (A1) was

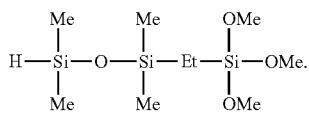

Ingredient (B1) was

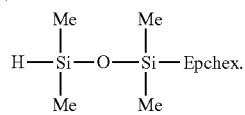

Ingredient (C2) was

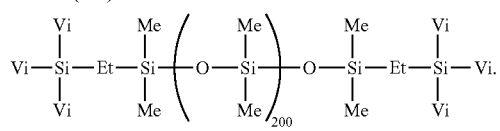

Ingredient (D1) was a platinum catalyst. In this example, 4 moles of ingredient (A1) and 2 moles of ingredient (B1) per mole of ingredient (C2) were used. A catalytic (ppm level) amount of ingredient (D1) was used.

Example 3

Preparation of a Polymer

A polymer was prepared by mixing 4 moles of ingredient (A1), 2 moles of ingredient (B1), a catalytic (ppm) amount of ingredient (D1), as described above in example 1, and 1 mole of ingredient (C3), which had the following formula:

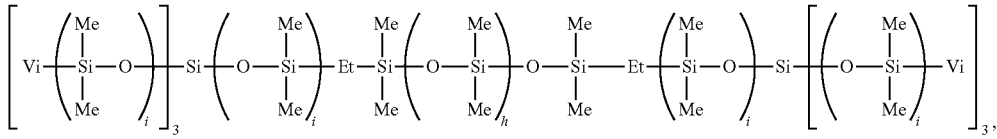

where each i had a value averaging 1 and h had a value of 200.

INDUSTRIAL APPLICABILITY

The dual curing silicone composition described above provides several advantages over previously disclosed dual curing systems. A polymerized network forms when the composition is cured via radiation cure, condensation cure, or a combination thereof. Without wishing to be bound by theory, it is thought that due to the presence of the groups of formula (I), the cured product has a similar general structure and strength regardless of which cure mechanism is used to cure the composition. This differs from previously disclosed dual curing systems, which have fewer curable functional groups than the compositions disclosed herein and which generally have different functional groups at the termini of the linear polymers (i.e., polymers having a single radiation curable group at one end and one or more moisture curable groups at the other end).

In applications where the inherent ambient secondary cure by the cationic mechanism (when J is epoxy-functional) is too slow, the polymer may allow fine tuning of the UV and moisture cure speeds as well as the physical properties.

In the method for preparing the polymer described above, ingredients (A) and (B) can readily be added to ingredient (C) to give polymers, which cure rapidly via UV and moisture routes with improved adhesion and physical properties over the simple linear end blocked analogues such as that shown above in paragraph [0006]. These polymers also exhibit significant cure speed advantages in the secondary cure over those described in paragraph [0006] due to the presence of a minimum of 3 hydrolyzable groups such as methoxy on the polymer terminus. Having multiple functionality at the ends allows moisture cure to be optimized, as well as the radiation cure without changing the DP. The DP may impact the mechanical properties as well as the viscosity, which may be minimized to allow easy dispensing and the possibility of higher filler levels in a composition comprising the polymer.

The invention claimed is:

1. A polymer comprises, per molecule, an average of two or more groups of formula (I):

(I)

where Z is selected from the group consisting of one silicon atom, and a spacer group comprising two or more silicon atoms in which E, A, and R may be bonded to the same silicon atom or different silicon atoms in the spacer group; where group A comprises a unit of formula

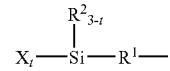

at a terminus;

group E comprises a unit of formula

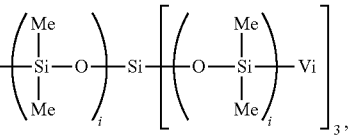

at a terminus;

whereby when Z is a spacer, groups of formula (I) comprise two or more of units selected from $R^2{}_2SiO_{2/2}$, $R^2SiO_{3/2}$, $SiO_{4/2}$, $R^{1'}$, $R^2{}_3SiO_{1/2}$, $(R^2{}_2)ESiO_{1/2}$, $(R^2{}_2)ASiO_{1/2}$, $(R^2)(E)(A)SiO_{1/2}$, $(R^2)ESiO_{2/2}$, $(A)ESiO_{2/2}$, $(R^2)ASiO_{2/2}$, $ESiO_{3/2}$, and $ASiO_{3/2}$ with the proviso that the spacer has at least one unit containing group A and at least one unit containing group E, where group A and group E may be bonded to the same silicon atom or to different silicon atoms in the spacer;

each R is independently selected from the group consisting of $R^1$, $R^2$, E, A, and a covalent bond; and where the two or more groups of formula (I) are spaced apart from one another in the polymer; and each $R^1$ is independently a divalent hydrocarbon group;

each $R^{1'}$ is independently a divalent hydrocarbon group;

each $R^2$ is independently a monovalent substituted or unsubstituted hydrocarbon group that is free of terminal aliphatic unsaturation;

each X is independently a monovalent hydrolyzable group;

each J is independently a monovalent epoxy functional organic group;
each subscript s independently has a value of 1, 2, or 3; and
each subscript t independently has a value of 1, 2, or 3;
where group A has formula (II)

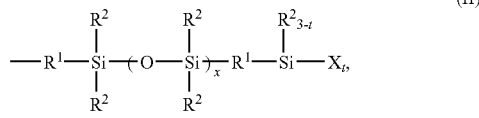 (II)

where subscript x has a value of 1 or more; or
where group E has formula (III)

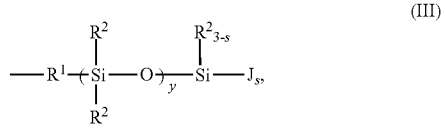 (III)

where subscript y has a value of 1 or more;
with the proviso that substantially all of group X and group J are in formula (I).

2. The polymer of claim 1, where group A has formula (II)

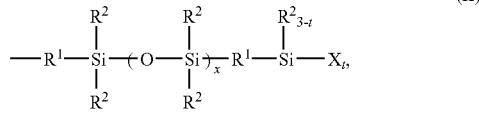 (II)

where subscript x has a value of 1 or more.

3. The polymer of claim 1, where group E has formula (III)

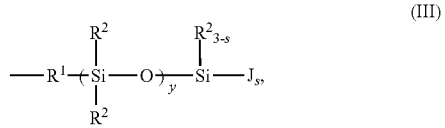 (III)

where subscript y has a value of 1 or more.

4. The polymer of claim 1, where the polymer has formula (IV):

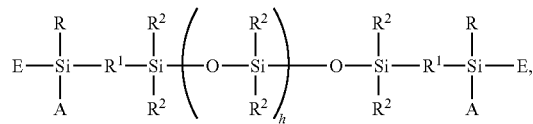

or a derivative thereof,
where each R is independently selected from the group consisting of E and A, and
subscript h has a value ranging from 50 to 1000, wherein in the derivative of formula (IV), the h units of formula $R^2_2SiO_{2/2}$ are replaced by units comprising $(R^2_2SiO_{2/2})_{b'}$, $(R^2SiO_{3/2})_{c'}$, $(SiO_{4/2})_{d'}$, $(R^{1'})_{f'}$, or $(R^2_3SiO_{1/2})_{g'}$, or a combination thereof, wherein the quantity (b'+c'+d'+f') may range from 50 to 1000, and g' has a value of 0 or more.

5. A polymer comprises, per molecule, an average of two or more groups of formula (I):

 (I)

where Z is selected from the group consisting of one silicon atom, and a spacer group comprising two or more silicon atoms in which E, A, and R may be bonded to the same silicon atom or different silicon atoms in the spacer group; where
group A comprises a unit of formula

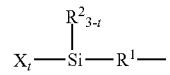

at a terminus;
group E comprises a unit of formula

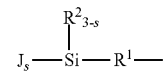

at a terminus;
whereby when Z is a spacer, groups of formula (I) comprise two or more of units selected from $R^2_2SiO_{2/2}$, $R^2SiO_{3/2}$, $SiO_{4/2}$, $R^{1'}$, $R^2_3SiO_{1/2}$, $(R^2_2)ESiO_{1/2}$, $(R^2_2)ASiO_{1/2}$, $(R^2)(E)(A)SiO_{1/2}$, $(R^2)ESiO_{2/2}$, $(A)ASiO_{2/2}$, $(R^2)ASiO_{2/2}$, $ESiO_{3/2}$, and $ASiO_{3/2}$ with the proviso that the spacer has at least one unit containing group A and at least one unit containing group E, where group A and group E may be bonded to the same silicon atom or to different silicon atoms in the spacer;
each R is independently selected from the group consisting of $R^1$, $R^2$, E, A, and a covalent bond; and
where the two or more groups of formula (I) are spaced apart from one another in the polymer; and
each $R^1$ is independently an oxygen atom or a divalent hydrocarbon group;
each $R^{1'}$ is independently a divalent hydrocarbon group;
each $R^2$ is independently a monovalent substituted or unsubstituted hydrocarbon group that is free of terminal aliphatic unsaturation;
each X is independently a monovalent hydrolyzable group;
each J is independently a monovalent epoxy functional organic group;
each subscript s independently has a value of 1, 2, or 3; and
each subscript t independently has a value of 1, 2, or 3;
with the proviso that substantially all of group X and group J are in formula (I);
and with the proviso where the polymer has formula (V):

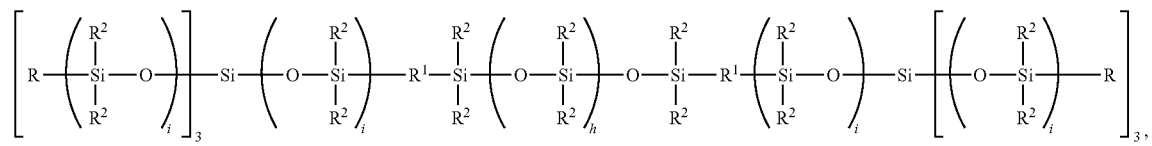

or a derivative thereof,
where each R is independently selected from the group consisting of E and A,
subscript h has a value ranging from 50 to 1000, and each subscript i has a value ranging from 1 to 10;
where group A has formula (II)

$$-R^1-\underset{R^2}{\overset{R^2}{Si}}+O-\underset{R^2}{\overset{R^2}{Si}}\overset{}{)_x}R^1-\underset{}{\overset{R^2_{3-t}}{Si}}-X_t, \quad (II)$$

where subscript x has a value of 1 or more; or
where group E has formula (III)

$$-R^1+\underset{R^2}{\overset{R^2}{Si}}-O\overset{}{)_y}\underset{}{\overset{R^2_{3-s}}{Si}}-J_s, \quad (III)$$

where subscript y has a value of 1 or more;
wherein:
in the derivative of formula (V), the h units of formula $R^2_2SiO_{2/2}$ are replaced by units comprising $(R^2_2SiO_{2/2})_{b''}$, $(R^2SiO_{3/2})_{c''}$, $(SiO_{4/2})_{d''}$, $(R^{1'})_{f''}$, or $(R^2_3SiO_{1/2})_{g''}$, or a combination thereof, wherein the quantity (b''+c''+d''+f'')=50 to 1000 and g'' has a value of 0 or more; or
in the derivative of formula (V), the i units of formula $R^2_2SiO_{2/2}$ may be replaced by units comprising $(R^2_2SiO_{2/2})_{b'''}$, $(R^2SiO_{3/2})_{c'''}$, $(SiO_{4/2})_{d'''}$, $(R^{1'})_{f'''}$, or $(R^2_3SiO_{1/2})_{g'''}$, or a combination thereof, wherein the quantity (b'''+c'''+d'''+f''')=1 to 25 and g''' has a value of 0 or more; or
in the derivative of formula (V), both the h units of formula $R^2_2SiO_{2/2}$ and the i units of formula $R^2_2SiO_{2/2}$ are replaced as described above.

6. A polymer comprises, per molecule, an average of two or more groups of formula (I):

$$-\underset{A}{\overset{R}{\underset{|}{Z}}}-E. \quad (I)$$

where Z is selected from the group consisting of one silicon atom, and a spacer group comprising two or more silicon atoms in which E, A, and R may be bonded to the same silicon atom or different silicon atoms in the spacer group; where
group A comprises a unit of formula $$X_t-\underset{}{\overset{R^2_{3-t}}{Si}}-R^1-$$

at a terminus;
group E comprises a unit of formula $$J_s-\underset{}{\overset{R^2_{3-s}}{Si}}-R^1-$$

at a terminus;
whereby when Z is a spacer, groups of formula (I) comprise two or more of units selected from $R^2_2SiO_{2/2}$, $R^2SiO_{3/2}$, $SiO_{4/2}$, $R^{1'}$, $R^2_3SiO_{1/2}$, $(R^2_2)ESiO_{1/2}$, $(R^2_2)ASiO_{1/2}$, $(R^2)(E)(A)SiO_{1/2}$, $(R^2)ESiO_{2/2}$, $(A)ESiO_{2/2}$, $(R^2)ASiO_{2/2}$, $ESiO_{3/2}$, and $ASiO_{3/2}$ with the proviso that the spacer has at least one unit containing group A and at least one unit containing group E, where group A and group E may be bonded to the same silicon atom or to different silicon atoms in the spacer;
each R is independently selected from the group consisting of $R^1$, $R^2$, E, A, and a covalent bond; and
where the two or more groups of formula (I) are spaced apart from one another in the polymer; and
each $R^1$ is independently an oxygen atom or a divalent hydrocarbon group;
each $R^{1'}$ is independently a divalent hydrocarbon group;
each $R^2$ is independently a monovalent substituted or unsubstituted hydrocarbon group that is free of terminal aliphatic unsaturation;
each X is independently a monovalent hydrolyzable group;
each J is independently a monovalent epoxy functional organic group;
each subscript s independently has a value of 1, 2, or 3; and
each subscript t independently has a value of 1, 2, or 3;
with the proviso that substantially all of group X and group J are in formula (I);
and with the proviso where the polymer has formula (VI):

$$(VI)$$

$$\underset{E}{\overset{A}{\underset{R^2}{Si}}}\underset{O-Si}{\overset{R^2}{\underset{R^2}{Si}}}\underset{R^2}{\overset{O}{Si}}-R^1-\underset{R^2}{\overset{R^2}{Si}}+O-\underset{R^2}{\overset{R^2}{Si}}\overset{}{)_h}O-\underset{R^2}{\overset{R^2}{Si}}-R^1-\underset{R^2}{\overset{R^2}{Si}}\underset{Si-O}{\overset{O-Si}{\underset{R^2R}{}}}_u\underset{E}{\overset{A}{R^2}}$$

or a derivative thereof, where subscript h has a value ranging from 50 to 1000,
each subscript u independently has a value ranging from 0 to 22;
where group A has formula (II)

$$-R^1-\underset{R^2}{\overset{R^2}{Si}}+O-\underset{R^2}{\overset{R^2}{Si}}\overset{}{)_x}R^1-\underset{}{\overset{R^2_{3-t}}{Si}}-X_t, \quad (II)$$

where subscript x has a value of 1 or more; or
where group E has formula (III)

$$-R^1+\underset{R^2}{\overset{R^2}{Si}}-O\overset{}{)_y}\underset{}{\overset{R^2_{3-s}}{Si}}-J_s, \quad (III)$$

where subscript y has a value of 1 or more;
wherein:
in the derivative of formula (VI), when u is greater than 0, then the silicon atoms to which group A and group E are bonded need not be adjacent in the ring; or
in the derivative of formula (VI), groups A and E are bonded to the same silicon atom in the ring, and the remaining silicon bonded groups in the ring are $R^2$; or
in the derivative of formula (VI), the h units of formula $R^2_2SiO_{2/2}$ are replaced by units comprising $(R^2_2SiO_{2/2})_{b''''}$, $(R^2SiO_{3/2})_{c''''}$, $(SiO_{4/2})_{d''''}$, $(R^{1'})_{f''''}$, or ($R^2_3SiO_{1/2})_{g''''}$, or a combination thereof, wherein the quantity ($b''''+c''''+d''''+f''''$) has a value ranging from 50 to 1000 and $g''''$ has a value of 0 or more.

7. A method of making the polymer of claim 1 comprising: combining ingredients comprising
(A) a polyorganohydrogen siloxane having an average, per molecule, of one silicon-bonded hydrogen atom and one to three terminal hydrolyzable groups;
(B) a polyorganohydrogen siloxane having an average, per molecule, one silicon-bonded hydrogen atom and one to three terminal epoxy functional organic groups; and
(C) a polymer having an average, per molecule, of at least 4 aliphatically unsaturated organic groups; and
(D) a hydrosilylation catalyst.

8. The method of claim 7, where ingredient (A) comprises a unit of formula

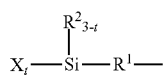

at a terminus, a silicon bonded hydrogen atom at another terminus, where the unit

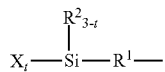

and the hydrogen atom are separated by 1 to 10 additional units selected from the group consisting of $R^2_2SiO_{2/2}$, $R^2SiO_{3/2}$, $SiO_{4/2}$, $R^2_3SiO_{1/2}$, $R^{1'}$, and combinations thereof; where
each $R^1$ is independently a divalent hydrocarbon group,
each $R^{1'}$ is independently a divalent hydrocarbon group,
each $R^2$ is independently a monovalent substituted or unsubstituted hydrocarbon group that is free of terminal aliphatic unsaturation,
each X is independently a monovalent hydrolyzable group,
subscript t has a value of 1, 2, or 3.

9. The method of claim 8, where ingredient (A) has formula (VII):

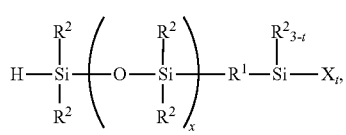

where subscript x has a value of 1 or more.

10. The method of claim 7, where ingredient (B) comprises a unit of formula

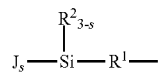

at a terminus, a silicon bonded hydrogen atom at another terminus,
where the unit

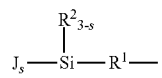

and the hydrogen atom are separated by 1 to 10 additional units selected from the group consisting of $R^2_2SiO_{2/2}$, $R^2SiO_{3/2}$, $SiO_{4/2}$, $R^2_3SiO_{1/2}$, $R^{1'}$, and combinations thereof; where
each $R^{1'}$ is independently a divalent hydrocarbon group,
each $R^2$ is independently a monovalent organic group that is free of terminal aliphatic unsaturation,
J is a monovalent epoxy functional organic group, and
subscript s has a value of 1, 2, or 3.

11. The method of claim 10, where ingredient (B) has formula (VIII):

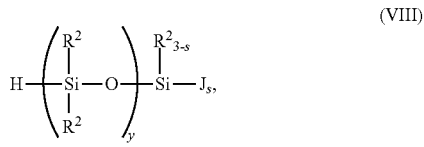

where
subscript y has a value of 1 or more.

12. The method of claim 7, where ingredient (C) has formula (IX):

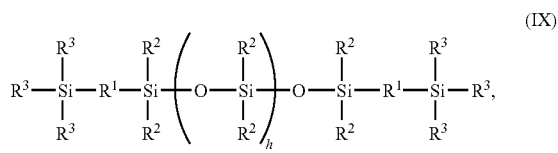

or a derivative thereof,
where subscript h has a value ranging from 50 to 1000,
each $R^1$ is independently a divalent hydrocarbon group,
each $R^2$ is independently a monovalent substituted or unsubstituted hydrocarbon group that is free of terminal aliphatic unsaturation,
each $R^3$ is independently an organic group having terminal aliphatic unsaturation.

13. The method of claim 7, where ingredient (C) has formula (X):

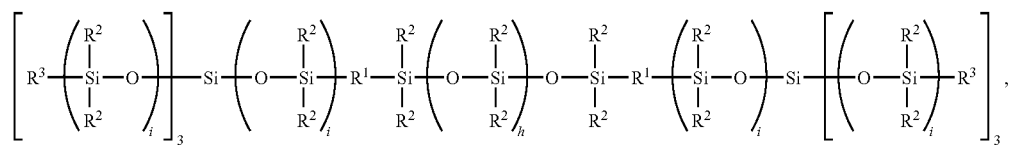

or a derivative thereof, where
- subscript i has a value ranging from 1 to 10,
- subscript h has a value ranging from 50 to 1000,
- each $R^1$ is independently an oxygen atom or a divalent hydrocarbon group,
- each $R^2$ is independently a monovalent substituted or unsubstituted hydrocarbon group that is free of terminal aliphatic unsaturation,
- each $R^3$ is independently an organic group having terminal aliphatic unsaturation.

14. The method of claim 7, where ingredient (C) has formula (XII):

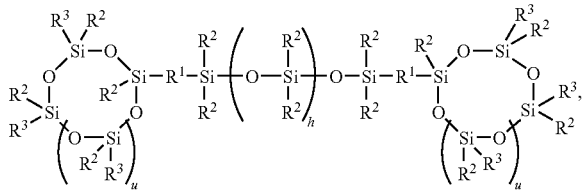

- subscript h has a value ranging from 50 to 1000,
- each subscript u has a value ranging from 0 to 22,
- each $R^1$ is independently an oxygen atom or a divalent hydrocarbon group,
- each $R^2$ is independently a monovalent organic group that is free of terminal aliphatic unsaturation,
- each $R^3$ is independently an organic group having terminal aliphatic unsaturation.

15. A composition comprising:
(a) the polymer of claim 1, and
(b) a photoinitiator.

16. A method comprising:
(i) applying the composition of claim 15 to a substrate, and
(ii) exposing the composition to ultra-violet radiation or atmospheric moisture, or both.

17. A method comprising:
(i) applying the composition of claim 15 to a substrate, and
(ii) exposing the composition to heat or atmospheric moisture, or both.

18. The method of claim 16, where the substrate is selected from the group consisting of an electronic device and a circuit board.

19. The composition of claim 15, further comprising one or more additional ingredients selected from the group consisting of (c) a filler, (d) a filler treating agent, (e) solvent, (f) a condensation reaction catalyst, (g) an adhesion promoter, (h) a colorant, (i) a reactive diluent, (j) a radical generator, (k) a shelf life extender, (l) an antioxidant, (m) a crosslinker, (n) a corrosion inhibitor, and a combination thereof.

20. The method of claim 17, where the substrate is selected from the group consisting of an electronic device and a circuit board.

* * * * *